(12) United States Patent  
Soohoo

(10) Patent No.: US 6,211,879 B1
(45) Date of Patent: Apr. 3, 2001

(54) SYSTEM AND METHOD FOR NAVIGATING IN MULTIPLE WINDOWS

(75) Inventor: Kenneth Soohoo, Redwood Shores, CA (US)

(73) Assignee: Planetweb, Inc., Redwood City, CA (US)

( * ) Notice: Subject to any disclaimer, the term of this patent is extended or adjusted under 35 U.S.C. 154(b) by 0 days.

(21) Appl. No.: 09/229,288

(22) Filed: Jan. 13, 1999

(51) Int. Cl.⁷ .................................................. G06F 3/14
(52) U.S. Cl. ............................................. 345/357; 345/341
(58) Field of Search .................................. 345/326, 327, 345/334, 339, 340, 341, 356, 357, 973

(56) References Cited

U.S. PATENT DOCUMENTS

| | | | |
|---|---|---|---|
| 5,075,673 | * 12/1991 | Yanker | 345/163 |
| 5,196,838 | * 3/1993 | Meier et al. | 345/118 |
| 5,495,566 | * 2/1996 | Kwatinetz | 345/341 |
| 5,500,929 | * 3/1996 | Dickinson | 345/356 |
| 5,710,897 | * 1/1998 | Schneider | 345/334 |
| 5,734,805 | * 3/1998 | Isensee et al. | 345/419 |
| 5,874,936 | * 2/1999 | Berstis et al. | 345/123 |
| 5,896,132 | * 4/1999 | Berstis et al. | 345/341 |
| 6,005,573 | * 12/1999 | Beyda et al. | 345/341 |

* cited by examiner

Primary Examiner—Crescelle N. dela Torre
(74) Attorney, Agent, or Firm—Wilson Sonsini Goodrich & Rosati

(57) ABSTRACT

Method of navigating on a display. A cursor is displayed within a first portion of the display. The first portion has edges and displays a portion of information. In response to movement of a pointing device, the cursor is moved within the first portion of the display. If the cursor comes within a particular distance of an edge of the first portion of the display, at least a partially different portion of the information is displayed. In response to a command and in response to movement of the pointing device, the cursor is moved beyond the first portion of the display. The information may comprise a document, a graphic, or a document including at least a graphic. The display may comprise a display of a word processor, a display of a web browser, or other display. A method of navigating on a display is described. A method of navigating on a display of a web browser and system for navigating on a display are also described.

38 Claims, 10 Drawing Sheets

SYSTEM AND METHOD FOR NAVIGATING IN MULTIPLE WINDOWS

BACKGROUND

1. Field of the Invention

The invention relates to graphical user interfaces, in particular, to navigation within graphical user interfaces.

2. Description of Related Art

In graphical user interfaces, a display of a system often includes various portions in which various items of information are displayed. These various portions may be in the form of windows. A window may show only a portion of the information. The user may desire to see other portions of the information. For example, a window may display a portion of a document, and the user may desire to see another portion of the document. Prior systems have been developed to allow a user to change the portion of the information that is displayed in some particular portion of the display. One approach has been the use of scroll bars. The scroll bar is a graphical symbol that is displayed at the edge of a portion of the screen in which the item, for example a document, is displayed. The user can cause a different portion of the information to be displayed by properly manipulating the scroll bar. For example, the user may move the cursor to an arrow symbol at the bottom of the scroll bar and then click on a pointing device to cause the document in the display to scroll, so that more of the document is shown in the direction of the arrow. Use of such a scroll bar often requires relatively fine movement of a pointing device to direct the cursor to the desired portion of the scroll bar. A user can move the cursor to another portion of the screen showing other information, such as another window showing another document. The user then may use a scroll bar on that window in order to show other parts of that information.

For example, computer functionality may be integrated with a television system or other system. In such systems, precise movement of a cursor into a scroll bar may be difficult. Further, use of a scroll bar may be slow because the user has to first move the cursor into the proper location of the scroll bar before causing the scrolling to occur

SUMMARY OF THE INVENTION

The invention includes a method of navigating on a display. A cursor is displayed within a first portion of the display. The first portion has edges and displays a portion of information. In response to movement of a pointing device, the cursor is moved within the first portion of the display. If the cursor comes within a particular distance of an edge of the first portion of the display, at least a partially different portion of the information is displayed. In response to a command and in response to movement of the pointing device, the cursor is moved beyond the first portion of the display.

According to an embodiment of the invention, the first portion of the display comprises a window. According to another embodiment of the invention, the display includes multiple non-overlapping frames.

According to one embodiment of the invention, the information comprises a document. In one embodiment, the document includes at least a graphic. According to another embodiment of the invention, the information comprises a graphic.

According to one embodiment of the invention, the command is generated in response to a user selecting a button on the pointing device. In one example, the button on the pointing device is associated with movement in a dimension other than movement in the plane of the display. According to another embodiment of the invention, the command is generated automatically in response to an end of the information being displayed at the edge of the first portion of the display. According to various examples, the end of the information comprises a right side of a document, a left side of a document, a bottom of a document, or a top of a document.

According to one example of the invention, the information comprises a document, and the portion of information comprises a portion of the document.

According to another embodiment of the invention, after the cursor is moved beyond the first portion of the display, the movement of the cursor is confined within a second portion of the display. In one example, after the cursor is moved into the second portion of the display, if the cursor comes within a particular distance of an edge of the second portion of the display, at least a partially different portion of information is displayed in the second portion of the display. In a further example, in response to a second command and in response to movement of the pointing device, the cursor is moved beyond the second portion of the display.

According to an embodiment of the invention, the appearance of the cursor is changed in response to the command. According to another embodiment, the cursor is enlarged in response to the command.

According to an embodiment of the invention, the particular distance of an edge comprises zero. According to another embodiment of the invention, the particular distance of an edge comprises a non-zero distance. According to one example of the invention, the distance is chosen to give the appearance of the cursor bumping the edge.

According to various embodiments of the invention, the display comprises a display of a word processor, a display of a web browser, or other display.

One embodiment includes a method of navigating on a display. A cursor is displayed within a first window on the display. The first window has edges and displays a document. In response to movement of a pointing device, the cursor is moved within the first window. If the cursor comes within a particular distance of an edge of the first window, the document is scrolled. In response to a first command and in response to movement of the pointing device, the cursor is moved beyond the first window.

One embodiment of the invention includes a method of navigating on a display of a web browser. Another embodiment of the invention includes a system for navigating on a display.

BRIEF DESCRIPTION OF THE DRAWINGS

The invention is illustrated by way of example, and not limitation in the drawings.

FIG. 1A shows a display including two documents according to an embodiment of the invention.

FIG. 1B shows a display including two documents according to an embodiment of the invention, where one of the documents has been scrolled.

FIG. 1C shows a display including two documents in which the cursor is enlarged and may move between the documents according to an embodiment of the invention.

FIG. 1D shows a display including two documents and a cursor that has been moved to a different portion of the display according to an embodiment of the invention.

FIG. 1E shows a display including two documents and a cursor that has been moved within one of the documents according to an embodiment of the invention.

FIG. 1F shows a display in which another document has been scrolled according to an embodiment of the invention.

DETAILED DESCRIPTION

The following is a description of embodiments of the invention. The embodiments shown help to illustrate the invention. However, it is not intended that the invention be limited to the precise embodiments shown.

In an embodiment of the invention, a user is able scroll a document within a portion of the user interface. The user moves the cursor with a pointing device. The user scrolls the document by moving the cursor to the edge of the portion of the display in which the document is displayed. For example, the user moves the cursor to the edge of the window, or frame, in which the document is displayed. When the cursor approaches the edge of the portion of the screen and the user continues to move the pointing device, the cursor stops at the edge of the portion of the screen, and the document scrolls. Thus, the cursor may appear to bump the edge of a window displaying the document, and the document scrolls as a result. In this way, movement of the cursor may be confined to the portion of the display in which the document is displayed.

Later, the user desires to work on a document in another portion of the display, for example in another window, or in another frame. The user selects a button on the pointing device. As a result of the user selecting the button, the cursor, according to an embodiment of the invention, is now allowed to move beyond the portion of the display in which the document is displayed. The cursor may then be displayed in a different manner (e.g., enlarged) to show that it can move freely throughout the display. When the cursor is in another portion of the display (e.g., another window or frame) in which the user desires to work on another document, the user may then cause the cursor to be confined within that portion of the screen. Now the other document is scrolled when the cursor comes to the edge of that other portion of the screen. In one embodiment of the invention, the cursor automatically pops out of the portion of the screen after the document has been scrolled and the end of the document is reached.

The action of scrolling when the cursor reaches the edge of a portion of the display may be referred to as bump scrolling. When the cursor is allowed to move freely around the display beyond the portion of the display, the bump scrolling is disabled. Bump scrolling is enabled again when the user again desires to work on a document in some portion of the display.

FIGS. 1A–F illustrate a method for navigating in a display according to an embodiment of the invention. In these figures, a sequence is shown in which first one document is scrolled using bump scrolling and then another document is scrolled using bump scrolling according to an embodiment of the invention.

Figure 1A:
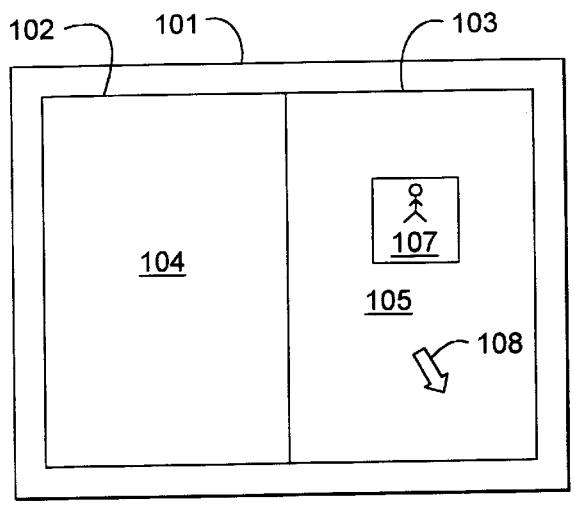
FIGS. 1A–F illustrate a method for navigating in a display according to an embodiment of the invention.

FIG. 1A shows a display including two documents according to an embodiment of the invention. FIG. 1A shows a display 101 that includes window 102 and window 103. Window 102 includes document 104, and window 103 includes document 105. Document 105 includes a graphic 107. As shown, cursor 108 is located in window 103 above document 105. According to an embodiment of the invention, cursor 108 is confined within window 103 unless the user enters a different mode in which the cursor 108 can be moved beyond window 103. Thus, FIG. 1A is an example of a display which has a first portion (window 102) having edges and displaying a portion of information (the portion of document 104 shown).

Figure 1B:
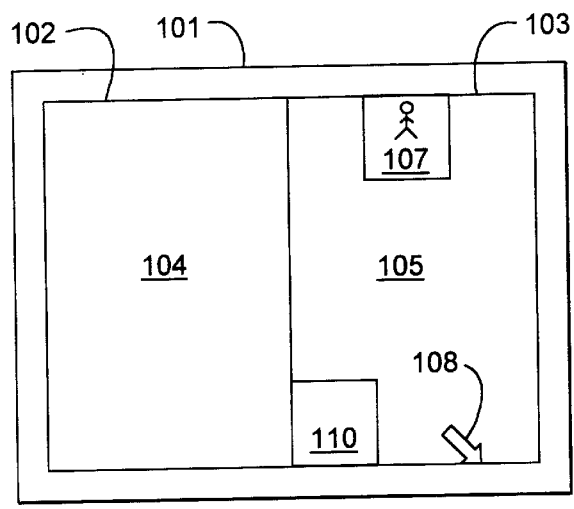

FIG. 1B shows a display including two documents according to an embodiment of the invention, where one of the documents has been scrolled. Shown in FIG. 1B, cursor 108 has been moved to a bottom edge of window 103. As a result, after cursor 108 is moved to the edge of window 103, the system responds by scrolling document 105 upward. Thus, at least a partially different portion of the information is now displayed in window 103. Here, graphic 107 has scrolled upward and graphic 110, which was previously hidden, is now displayed as part of document 105.

Figure 1C:
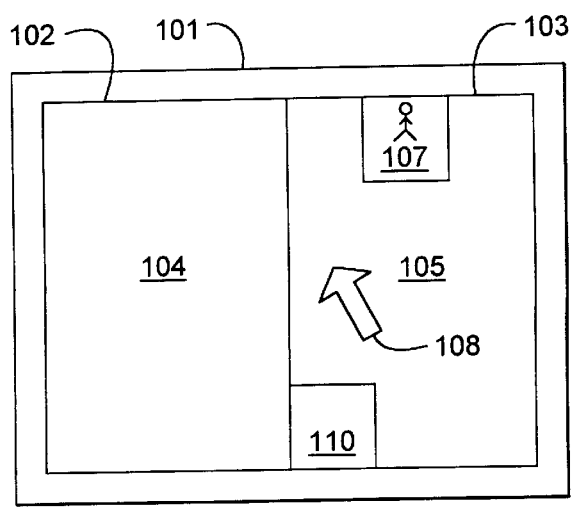

FIG. 1C shows a display including two documents in which the cursor is enlarged and may move between the documents according to an embodiment of the invention. The user moves the cursor around the display by use of a pointing device. Such a pointing device may comprise a remote control, mouse, or other device. In FIG. 1C cursor 108 is shown enlarged relative to cursor 108 in FIG. 1B. The enlarged cursor 108 indicates that the cursor may move beyond window 103. The user may cause the system to enter this state by selecting a designated button on the pointing device. Alternatively, the system enters this mode under some other conditions, such as by other user action or automatically.

Figure 1D:
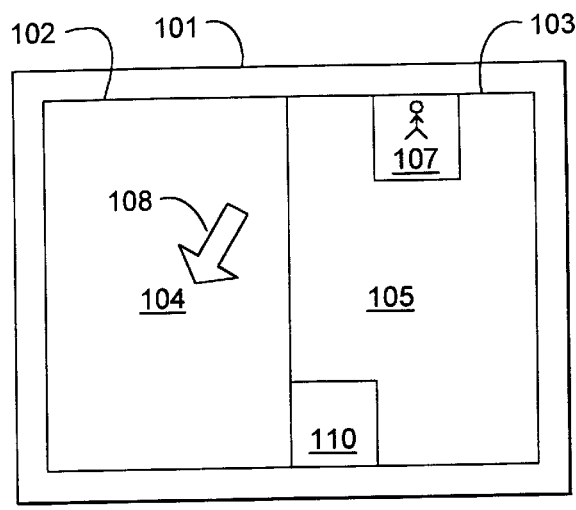

FIG. 1D shows a display including two documents and a cursor that has been moved to a different portion of the display according to an embodiment of the invention. Cursor 108 has been moved into window 102 such that it is now above document 104. Cursor 108 is enlarged in FIG. 1D relative to cursor 108 in FIGS. 1B and 1A. This indicates that cursor 108 may be moved freely throughout display 101.

Figure 1E:
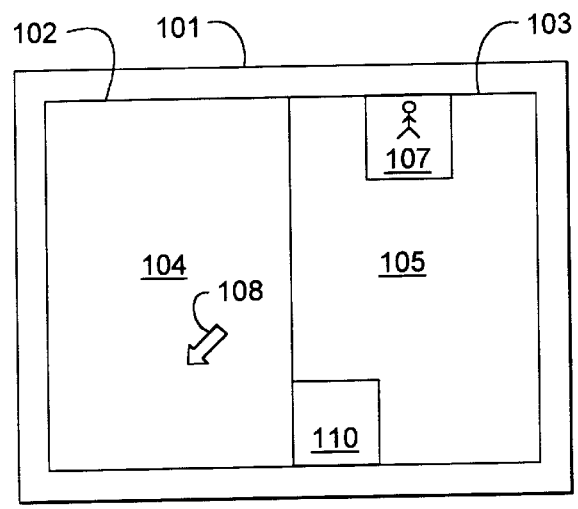

FIG. 1E shows a display including two documents and a cursor that has been moved within one of the documents according to an embodiment of the invention. Now, cursor 108 is shown shrunk in FIG. 1E relative to cursor 108 in FIG. 1D. This indicates that cursor 108 is confined within window 102. Thus, if cursor 108 is moved to an edge of window 102 and the user continues to move the pointing device, then document 104 is scrolled.

Figure 1F:
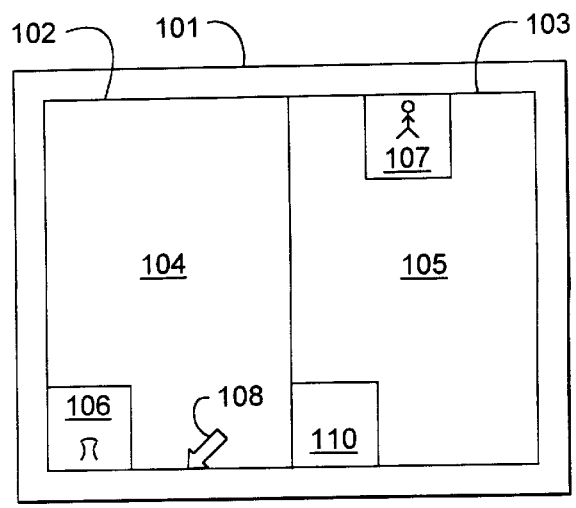

FIG. 1F shows a display in which another document has been scrolled according to an embodiment of the invention.

As shown, cursor 108 has been moved to the bottom edge of window 102. Document 104 has been scrolled such that graphic 106 now appears in the bottom left hand corner of window 102. Note that the user may cause information displayed in a particular window to be scrolled in various directions. For example the scrolling may take place in an upward direction, downward direction, a left direction, a right direction, or some diagonal direction. Items other than documents such as graphical images may be displayed within respective windows. According to one embodiment of the invention, scroll bars are present on the windows and may be used alternatively to bump scrolling. In one embodiment of the invention, a frame system is used to display information in which the display includes fully joined frames.

Embodiments of the invention may be used in web page navigation, other multidocument systems, a set top box (STB) for a television, a television system, a digital video disk (DVD) system, digital satellite system (DSS), or other system.

Figure 2:
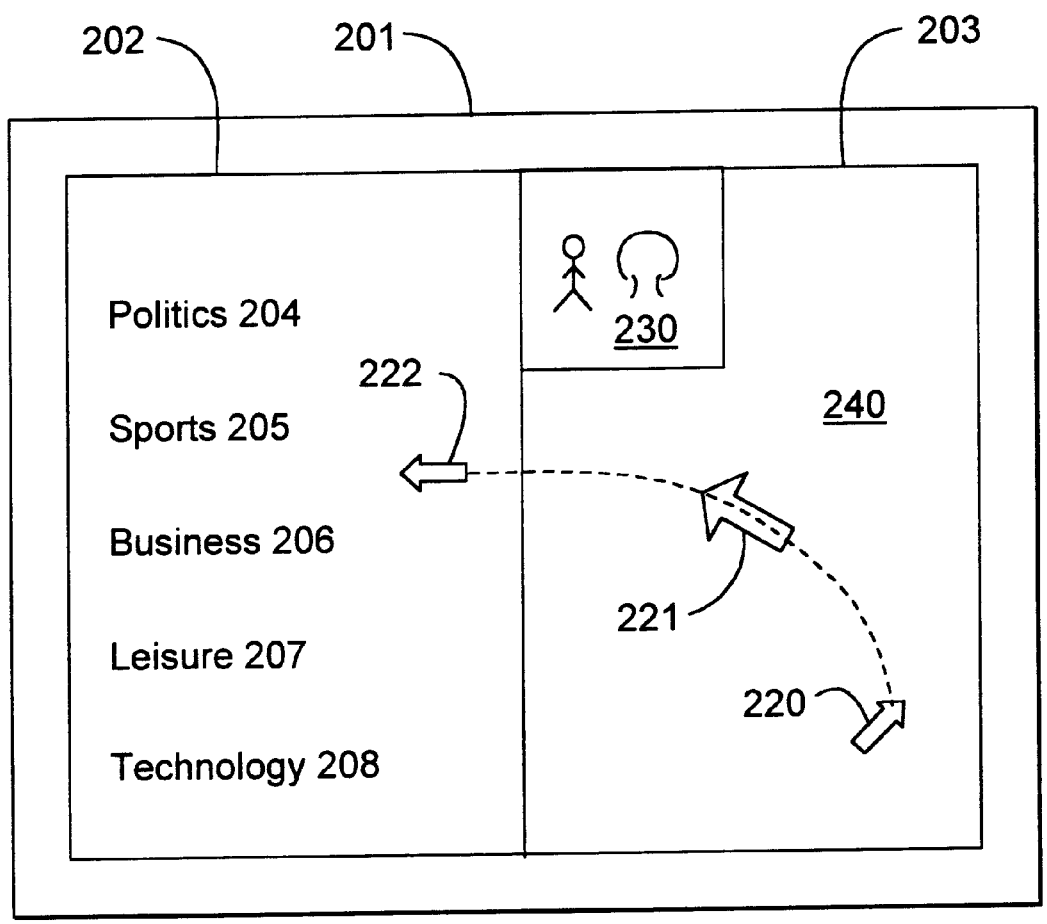
FIG. 2 shows a display including two portions, between which a cursor may be moved according to an embodiment of the invention.

FIG. 2 shows a display including two portions, between which a cursor may be moved according to an embodiment of the invention. This figure shows a sequence of the cursor within the display. Display 201 includes window 202 and window 203. Window 202 includes the following items: politics 204, sports 205, business 206, leisure 207, and technology 208. These items are items in a table of contents, any of which may be selected to cause corresponding information to be displayed in window 203. Window 203 shows document 240, which includes graphic 230. Cursors 220, 221, and 222 represent movement of the same cursor from window 203 to window 202. Cursor 220 is confined within window 203 until a command is issued that allows the cursor to move beyond window 203. This command may be issued as a result of the user selecting a button on the pointing device or other user action, or the command may be issued automatically by the computer system to cause a mode to be entered in which the cursor may be moved freely throughout the display. For example, the command might be issued automatically when the cursor is placed at the edge of the window and the document has scrolled to the end of the document. Then, the cursor may appear to jump out of the window in which the document is displayed in the direction of the movement of the pointing device. Here, cursor 221 is enlarged relative to cursor 220 and cursor 222. This indicates that cursor 221 may be moved beyond window 203. Thus, the document 240 is not scrolled when cursor 221 reaches the edge of window 203. Cursor 222 is in window 202. Cursor 222 is smaller than cursor 221 and therefore indicates that cursor 222 is confined within window 202. User may use cursor 222 to select one of items 204–208. When one of such items is selected, the contents of window 203 may change. According to one embodiment of the invention, cursor 222 is not confined within window 202, however, cursor 220 is confined within window 203. Such a configuration in which cursor 222 is not confined within window 202 may be used in a system in which scrolling is not necessary in window 202, but is necessary or desirable in window 203. For example, information shown within window 202 may be displayed fully while document 240 may be only partially displayed within window 203.

Figure 3A:
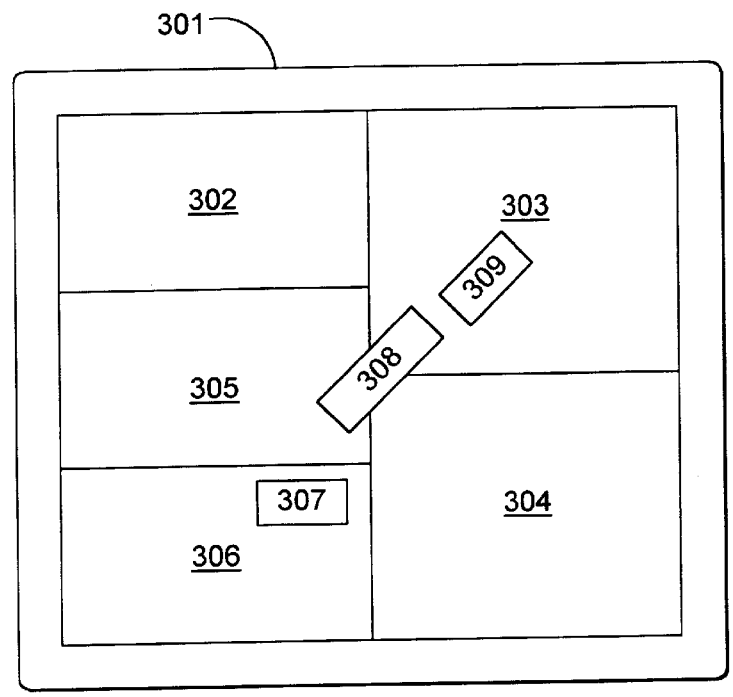
FIG. 3A shows a display including five portions, between which a cursor may be moved according to an embodiment of the invention.

FIG. 3A shows a display including five portions, between which a cursor may be moved according to an embodiment of the invention. Cursors 307, 308, and 309 represent a cursor which is moved from portion 306 to portion 303. Display 301 includes portions 302, 303, 304, 305, and 306. Such portions may be displayed according to a non overlapping frame configuration of the display or according to some other configuration of the display. First, cursor 307 is confined within portion 306. When cursor 307 comes within a particular distance of an edge of portion 306, then at least a partially different portion of the information displayed within portion 306 is displayed within portion 306. For example, a document displayed within portion 306 may be scrolled. Such action may take place according to one embodiment of the invention when the user continues to move the pointing device such that the cursor would continue beyond the portion 306 if it were not confined within portion 306. Scrolling of the information within portion 306 may be accelerated based on how far the user moves the pointing device. For example, if a user moves the pointing device a distance Y beyond an area corresponding to the edge of portion 306, then the scrolling may take place at a particular speed. Then, if the user moves the pointing device a distance two times Y, the scrolling may take place at two times the particular speed. Other ratios between movement of the pointing device and acceleration of the scrolling are possible. According to one embodiment of the invention, such relationship is chosen so as to create an intuitive feel for scrolling of information in portion 306 corresponding to movement of the pointing device.

A command is issued in the system to allow cursor 307 to move beyond portion 306. This command may be as a result of the user selecting a button of the pointing device or be to generate automatically, for example when the end of the information displayed in portion 306 has been reached. When cursor 307 is able to move beyond portion 306, then cursor 307 is enlarged, as shown here as cursor 308. Cursor 308 may be then moved into another portion of the screen which a user wishes to take some action. For example, here cursor 308 has been moved into portion 303 and is shown as cursor 309. The user manipulates the pointing device to cause cursor 309 to be confined within portion 303. Alternately, cursor 309 is automatically confined within portion 303 after cursor 309 enters portion 303. Scrolling occurs when the cursor comes within a particular distance of an edge of portion 303. According to one embodiment of the invention, scrolling occurs only when the user continues to move the pointing device such that the cursor would otherwise move beyond portion 303 if cursor 309 were not confined within portion 303.

Figure 3B:
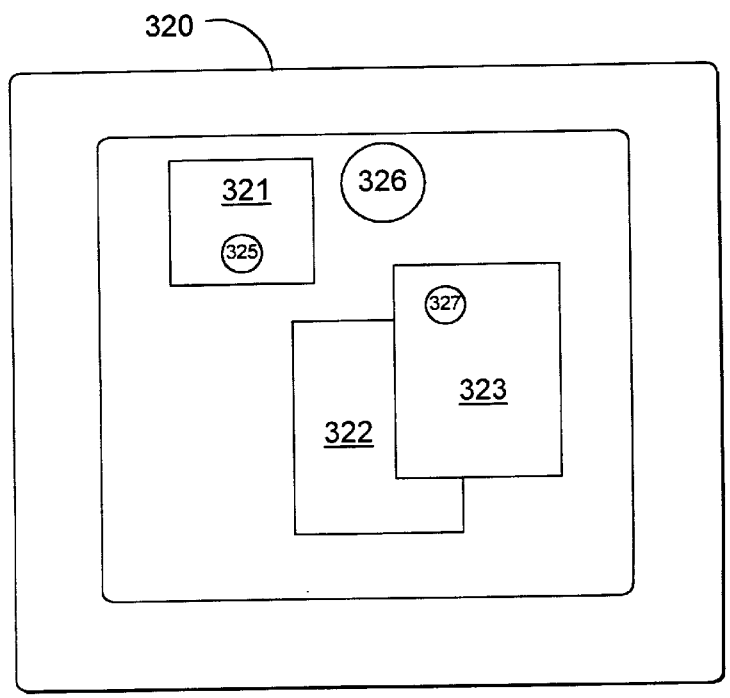
FIG. 3B shows a display including at least three portions, between which a cursor may be moved according to an embodiment of the invention.

FIG. 3B shows a display including at least three portions, between which a cursor may be moved according to an embodiment of the invention. Display 320 includes portion 321, 322, and 323. A cursor that moves among the respective portions is shown as cursors 325, 326, and 327. Portions 321, 322, and 323, according to one embodiment of the invention, may be overlapping windows in a configuration determined by the system's operating system. Here, cursor 325 is shown in portion 321. Cursor 325 would be confined within portion 321 such that scrolling occurs when cursor 325 comes within a particular distance of the edge of portion 321 and the pointing device is manipulated in a prescribed manner. Cursor 325 may then move beyond portion 321 in response to a command. Then the appearance of cursor 325 is changed to indicate that cursor 325 may move beyond portion 321. For example, herein a large cursor 326 is shown. Then, the user may desire to work in another portion of the screen and cause scrolling to occur when the cursor comes within a particular distance of such other portion of the screen. For example, here cursor 327 is shown within portion 323. Cursor 327 represents cursor 326 moved within portion 323 after execution of a command caused cursor 327 to be confined within portion 323. Cursors 325, 326, and 327 may take various shapes or appearances.

Figure 4:
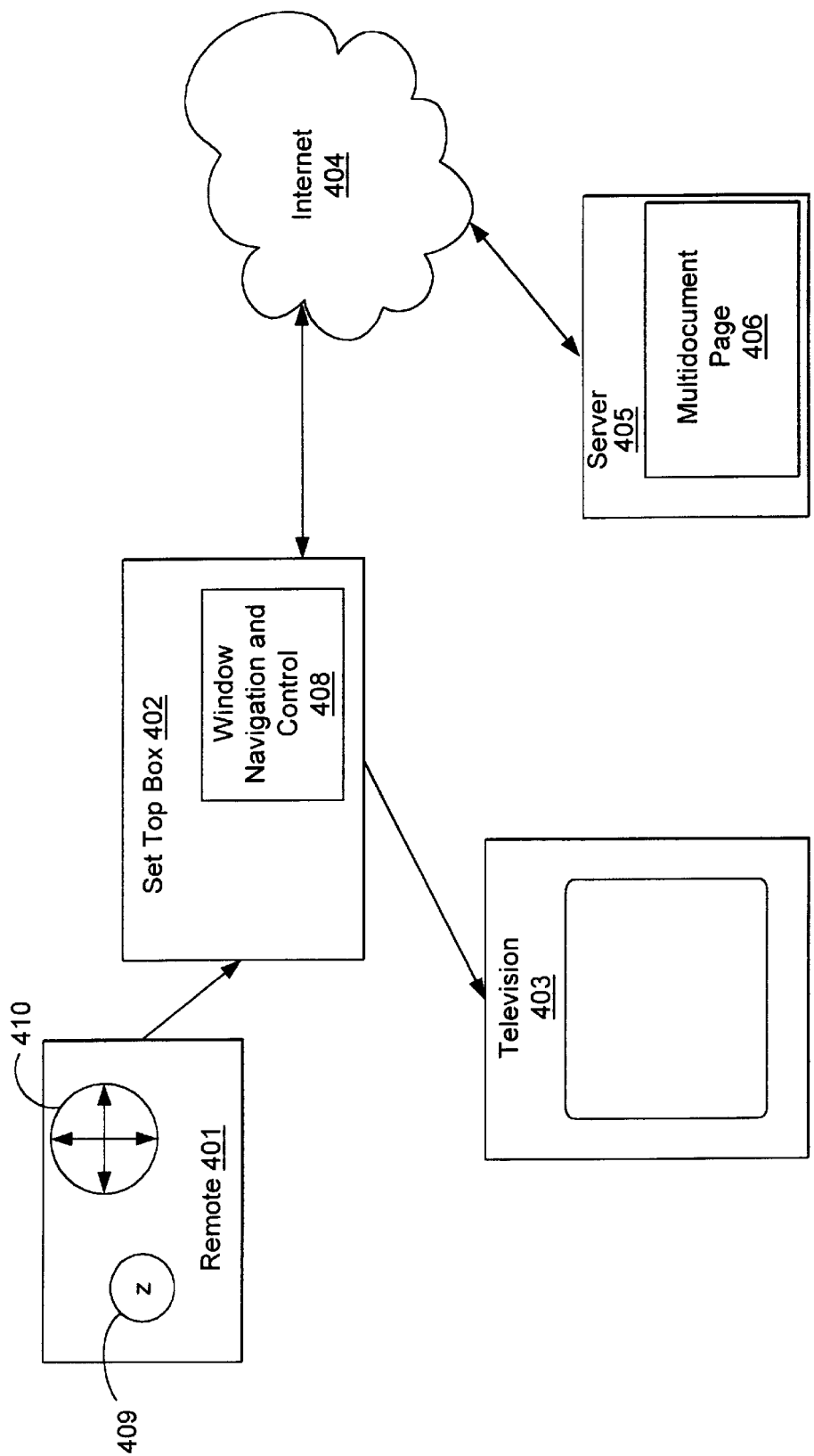
FIG. 4 shows a system according to an embodiment of the invention including a television and a remote.

FIG. 4 shows a system according to an embodiment of the invention including a television and a remote. Remote 401 communicates with set top box 402 in order to cause selected actions on television 403. Set top box 402 communicates with Internet 404. Internet 404 allows for communication with server 405. Set top box 402 includes window navigation and control 408, which allows for navigation on television 403, according to an embodiment of the invention. Server 405 includes a multidocument page 406. Thus, a web page with multiple documents may be displayed, according to one embodiment of the invention, on television 403. The user may navigate within the multiple documents using an embodiment of the invention. The user navigates within a page using directional control 410. When the cursor approaches the edge of a window within the page, the document within the window is scrolled. When the user desires to move from the window containing the displayed document, the user presses button 409 to allow the cursor to move freely throughout the screen on television 403. When the user again wishes to work within a particular document on a particular window on television 403, the user may again, according to one embodiment of the invention, press button 409. Then, the cursor is confined within the selected window.

The functionality of the set top box may be integrated within the television rather than as a separate component, according to one embodiment of the invention.

Figure 5:
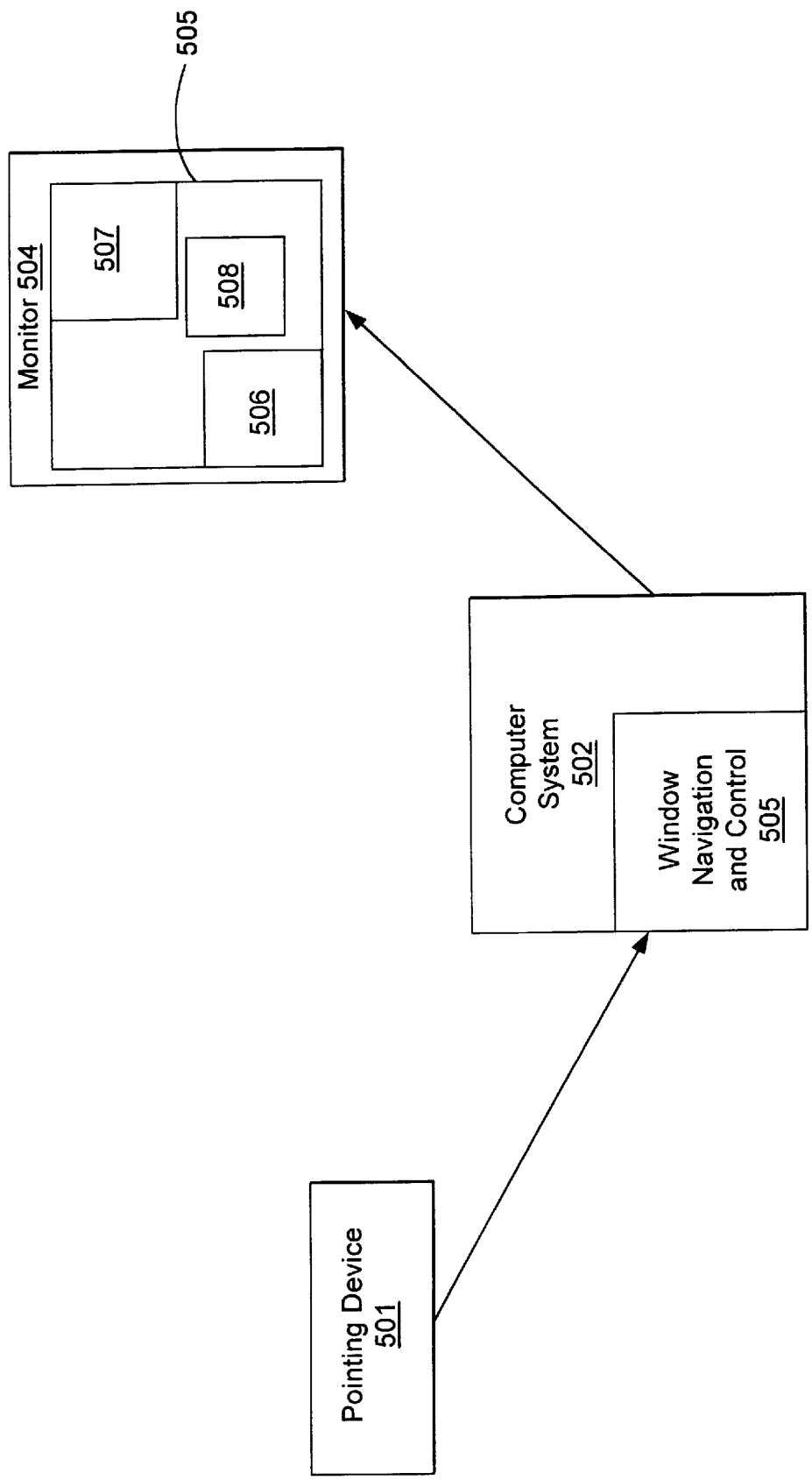
FIG. 5 shows a system according to an embodiment of the invention including a computer system, monitor, and pointing device.

FIG. 5 shows a system according to an embodiment of the invention including a computer system, monitor, and pointing device. Computer system 502 is coupled to monitor 504, which includes display 505. Display 505 includes portions 506, 507, and 508, in which various items of information may be displayed. The user navigates within display 505 with the help of pointing device 501 and window navigation and control 503, which is included within computer system 502. The user is able to navigate, according to an embodiment of the invention, within portions 506, 507, and 508, causing information within respective portions to scroll, and causing the cursor to move beyond the respective portion when the user chooses to allow such action to take place.

Figure 6:
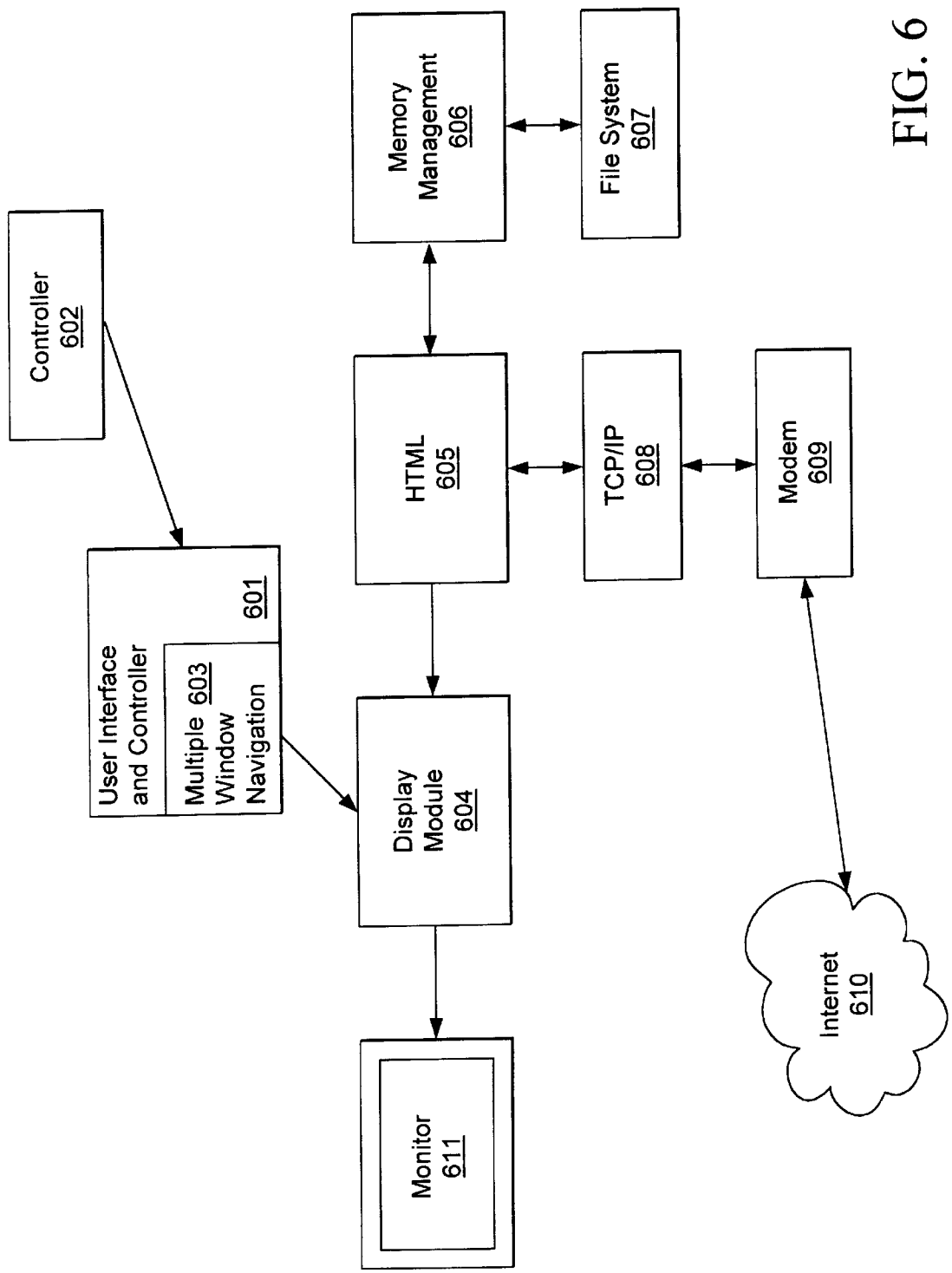
FIG. 6 shows a system according to an embodiment of the invention including various functional components.

FIG. 6 shows a system according to an embodiment of the invention including various functional components. Such an architecture is only one of many possible embodiments of the invention. For example, various of the components may be combined or eliminated. The arrangement of the components, according to other embodiments of the invention, may be changed. Shown in the figure is Internet 610 with which the system communicates by a modem 609. TCP/IP 608 provides an interface with modem 609. HTML 605 receives information from Internet 610 via TCP/IP 608. HTML 605 may convert such information into a format that can be operated on by display module 604 and then pass the information to display module 604. HTML 605 is coupled to memory management 606, which is further coupled to file system 607. According to an embodiment of the invention, HTML 605 provides a single pass of information to be displayed so that, for example, display module 604 does not need to query HTML 605 for the document again once display module 604 has received the document. Display module 604 displays information on monitor 611. User interface and controller 601 is coupled to display module 604 to cause display module 604 to display selected information on monitor 611.

Multiple window navigation and control 603 is within user interface and controller 601 and provides navigation on monitor 611 according to the invention. Controller 602 communicates with user interface and controller 601 to provide the user's selected movement of the cursor to the system.

Figure 7:
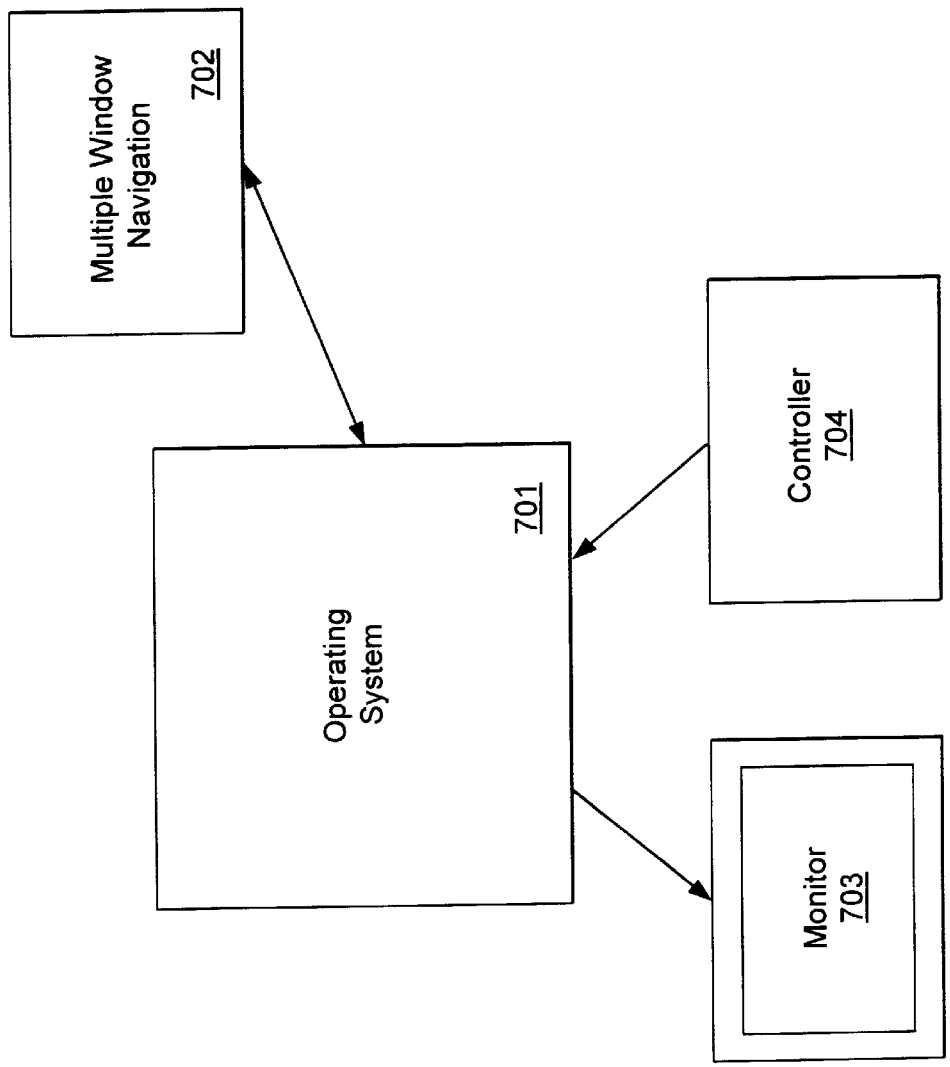
FIG. 7 shows a system according to an embodiment of the invention including an operating system.

FIG. 7 shows a system according to an embodiment of the invention including an operating system. One embodiment of the invention includes addition of functionality of cursor movement and scrolling into an operating system that was designed with other methods of window navigation and control. For example, the system may be added to an operating system that was designed for the use of scroll bars. Operating system 701 communicates with monitor 703 to display information to a user. The user uses controller 704 to communicate with operating system 701. In response, operating system 701 causes certain items to be displayed on monitor 703. Multiple window navigation 702 is coupled to operating system 701 to allow navigation within and among multiple windows according to an embodiment of the invention.

Figure 8:
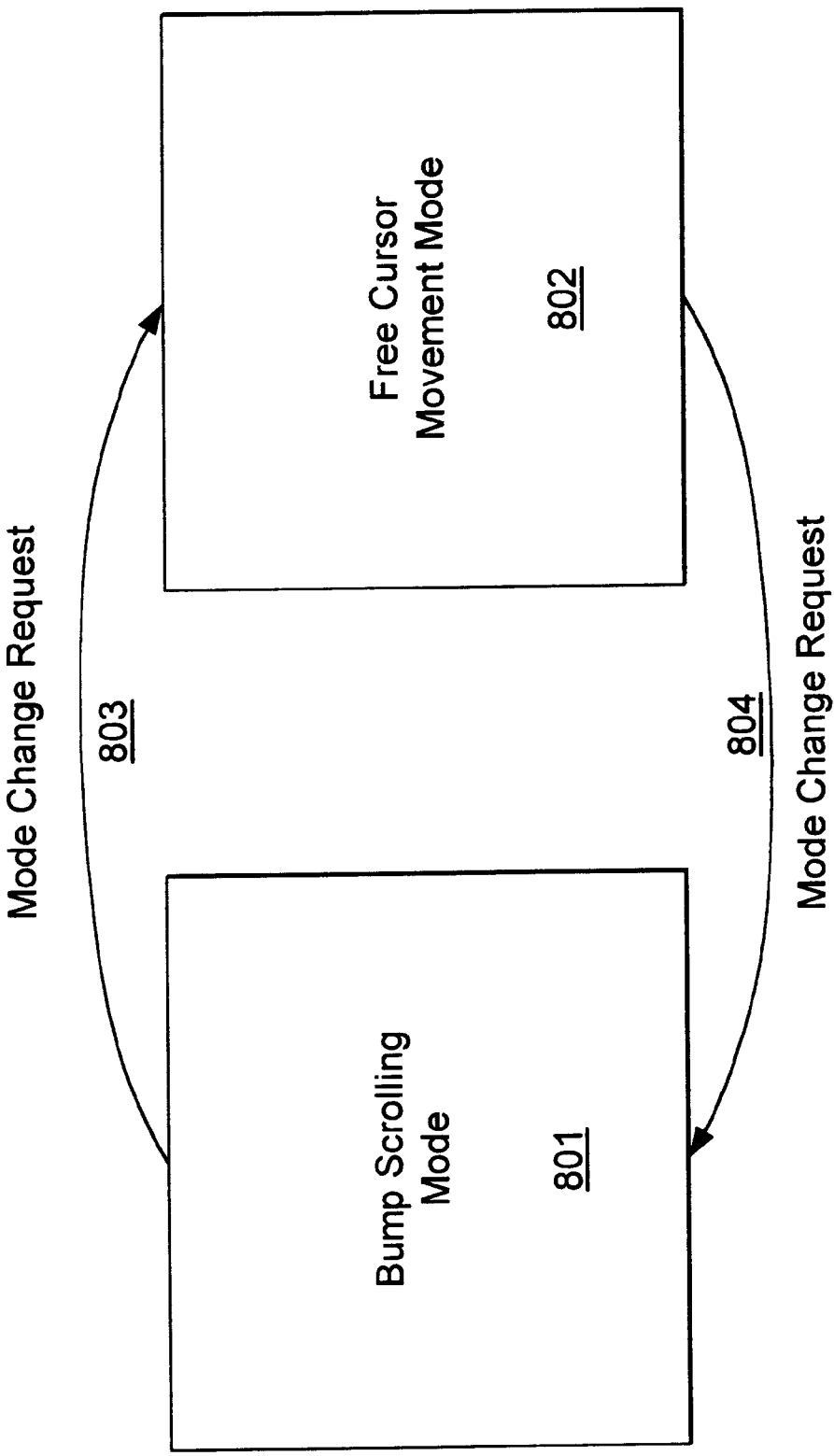
FIG. 8 shows a state diagram according to an embodiment of the invention.

FIG. 8 shows a state diagram according to an embodiment of the invention. In bump scrolling mode 801 information in a portion of the display is scrolled when the cursor appears to bump against the edge of the portion of the display. When a mode change request 803 is received, the system enters free cursor movement mode 802. In free cursor movement mode 802, the cursor may move freely throughout the display. Upon receipt of mode change request 804, the system returns to bump scrolling mode 801.

Figure 9:
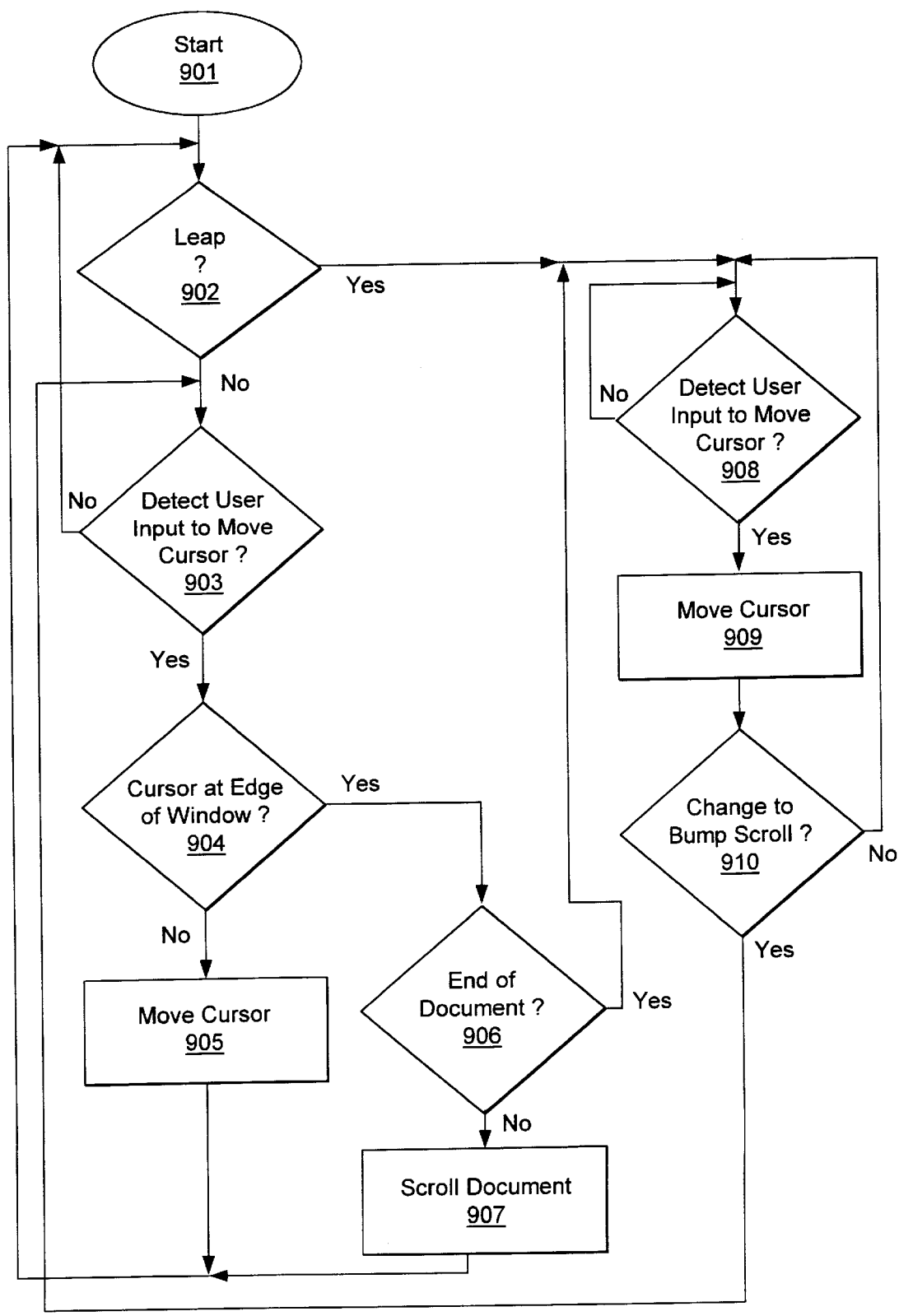
FIG. 9 shows a flow diagram according to an embodiment of the invention.

FIG. 9 shows a flow diagram according to one embodiment of the invention. The flow diagram starts at block 901. Check for a command to leap (block 902). If a command to leap has not been received, detect user input to move the cursor (block 903). If no user input to move the cursor has been received, loop back to block 902. If user input to move cursor has been received, determine whether the cursor is at the edge of the window (block 904). If the cursor is not at the edge of the window, then move the cursor according to movement of the pointing device (block 905). After moving the cursor, then return to block 902.

If cursor is at the edge of the window (block 904), then determine if the end of the document is reached (block 906). If the end of the document is not reached as determined in block 906, then scroll the document (907).

If a command to leap was detected in block 902, then proceed to block 908 and detect whether there is user input to move the cursor. If there is no user input to move the cursor, then loop by returning to block 908. If there is user input to move the cursor, then move the cursor (block 909). Thus, in this part of the process, the cursor may be moved beyond the first window. Detect whether there is a command to change to bump scrolling (block 910). Such a change may occur as a result of a user input or may occur automatically under certain circumstances, such as the cursor entering a particular portion of the display. If the system is not to change from bump scrolling, then loop by returning to block 908. If a command is received to change to bump scrolling, then return to block 903 and detect user input to move cursor.

Note that block 906 is optional. If an end of a document is reached (block 906), then the system may leap from the window which the cursor was initially confined. If an end of the document is detected, then proceed to block 908 and detect user input to move the cursor.

Various embodiments of the invention have been illustrated in the figures and have been described in the corresponding text of this application. This foregoing description is not intended to limit the invention to the precise forms disclosed. Rather, the invention is to be construed to the fill extent allowed by the following claims and their equivalents.

What is claimed is:

1. A method of navigating on a display, the method comprising:

displaying a cursor within a first portion of the display, the first portion having edges and displaying a portion of information;

in response to movement of a pointing device, moving the cursor within the first portion of the display;

if the cursor comes within a particular distance of an edge of the first portion of the display, displaying at least a partially different portion of the information;

in response to a command and in response to movement of the pointing device, moving the cursor beyond the first portion of the display; and wherein the command is generated in response to a user selecting a button on the pointing device, and the button on the pointing device is associated with movement in a dimension other than movement in a plane of the display.

2. The method of claim 1, wherein the first portion of the display comprises a window.

3. The method of claim 1, the display including multiple non-overlapping frames.

4. The method of claim 1, wherein the information comprises a document.

5. The method of claim 1, the information comprising a document and the portion of information comprising a portion of the document.

6. The method of claim 1, comprising:

after moving the cursor beyond the first portion of the display, confining movement of the cursor within a second portion of the display.

7. The method of claim 6, comprising:

after moving the cursor into the second portion of the display, if the cursor comes within a particular distance of an edge of the second portion of the display, displaying at least a partially different portion of information in the second portion of the display.

8. The method of claim 7, comprising:

in response to a second command and in response to movement of the pointing device, moving the cursor beyond the second portion of the display.

9. The method of claim 1, including changing appearance of the cursor in response to the command.

10. The method of claim 1, including enlarging the cursor in response to the command.

11. The method of claim 1, wherein the particular distance of an edge comprises zero.

12. The method of claim 1, the display comprising a display of a word processor.

13. The method of claim 1, the display comprising a display of a web browser.

14. A method of navigating on a display, the method comprising:

displaying a cursor within a first window on the display, the first window having edges and displaying a document;

in response to movement of a pointing device, moving the cursor within the first window;

if the cursor comes within a particular distance of an edge of the first window, scrolling the document;

in response to a first command and in response to movement of the pointing device, moving the cursor beyond the first window;

enlarging the cursor in response to the first command;

after moving the cursor beyond the first window, if the cursor comes with a particular distance of an edge of a second window and in response to a second command, scrolling a document in the second window;

in response to the second command, shrinking the cursor.

15. The method of claim 14, the first and second commands being generated in response to a user selecting a button on the pointing device.

16. The method of claim 14, the command being generated automatically in response to an end of the document being displayed at the edge of the first window of the display.

17. The method of claim 14, comprising:

if an end of the document in the second window is reached, moving the cursor beyond the second window.

18. The method of claim 14, the second command being generated in response to a user selecting a button on the pointing device; and the button being associated with movement in a dimension other than movement in a plane of the display.

19. The method of claim 14, scrolling the document comprising showing new portions of the document in direction of movement of the cursor.

20. The method of claim 14, scrolling the document comprising showing new portions of a left portion of the document if the cursor is moved left.

21. The method of claim 14, wherein the document includes graphics.

22. The method of claim 14, wherein speed of scrolling is increased in response to correspondingly greater movement of the pointing device.

23. A method of navigating on a display of a web browser for use with a network, the method comprising:

displaying a cursor within a first portion of the display, the first portion having edges and displaying a first portion of information obtained via the network;

in response to movement of a pointing device, moving the cursor within the first portion of the display;

if the cursor comes within a particular distance of an edge of the first portion of the display, scrolling the information in direction of movement of the cursor;

in response to a first command and in response to movement of the pointing device, moving the cursor beyond the first portion of the display;

in response to a second command, moving the cursor within a second portion of the display, the second portion including a second portion of information from the world wide web, and if the cursor comes within a particular distance of an edge of the second portion of the display, scrolling the additional information in the direction of movement of the cursor;

enlarging the cursor in response to the first command; and shrinking the cursor in response to the second command.

24. The method of claim 23, the first and second portions of the display comprising respective windows.

25. The method of claim 23, the first and second portions of the display comprising respective frames.

26. The method of claim 23, the first and second portion of the display displaying respective different pages from a web site.

27. The method of claim 23, the first portion of the display displaying a list of items, and the second portion of the display displaying an item selected from the list of items.

28. The method of claim 23, the pointing device comprising a remote control device.

29. The method of claim 23, the pointing device comprising a remote control device for a television.

30. The method of claim 23, the pointing device comprising a four directional pad that controls movement of the cursor and a button that causes issuance of the first and second commands, the button being associated with movement in a dimension other than movement in the plane of the display.

31. The method of claim 23, the first and second portions of the information comprising portions of the same document.

32. The method of claim 23, scrolling a document comprising showing new portions of the document in the direction of movement of the cursor.

33. The method of claim 23, scrolling a document comprising showing new portions of a left portion of the document if the cursor is moved to the left.

34. The method of claim 23, wherein speed of scrolling is increased in response to correspondingly greater movement of the pointing device.

35. A system for navigating on a display, the system comprising:

logic that displays a cursor within a first portion of the display, the first portion having edges and displaying a portion of information;

logic that, in response to movement of a pointing device, moves the cursor within the first portion of the display;

logic that, if the cursor comes within a particular distance of an edge of the first portion of the display, displays at least a partially different portion of the information;

logic that, in response to a command and in response to movement of the pointing device, moves the cursor beyond the first portion of the display; and logic that enlarges the cursor in response to the command, and shrinks the cursor in response to a second command that causes information to be scrolled in a second portion of the display if the cursor comes within a particular distance of an edge of the second portion of the display.

36. The system of claim 35, the information comprising a document and the portion of information comprising a portion of the document.

37. The system of claim 35, the display comprising a display of a word processor.

38. The system of claim 35, the display comprising a display of a web browser.

* * * * *